US011834840B2

(12) United States Patent
Fauchery et al.

(10) Patent No.: US 11,834,840 B2
(45) Date of Patent: Dec. 5, 2023

(54) FITTING WITH IMPROVED BOSS STRUCTURE

(71) Applicant: SKF AEROSPACE FRANCE S.A.S., Saint-Vallier (FR)

(72) Inventors: Florent Fauchery, Montmeyran (FR); Anthony Jerome, Lons-le-Saunier (FR)

(73) Assignee: SKF Aerospace France S.A.S, Montigny-le-Bretonneux (FR)

( * ) Notice: Subject to any disclaimer, the term of this patent is extended or adjusted under 35 U.S.C. 154(b) by 513 days.

(21) Appl. No.: 16/900,309

(22) Filed: Jun. 12, 2020

(65) Prior Publication Data

US 2020/0308845 A1  Oct. 1, 2020

Related U.S. Application Data

(63) Continuation of application No. 15/915,394, filed on Mar. 8, 2018, now abandoned.

(Continued)

(51) Int. Cl.
*E04F 13/08* (2006.01)
*E04F 13/16* (2006.01)
*F16B 5/00* (2006.01)

(52) U.S. Cl.
CPC ...... *E04F 13/0864* (2013.01); *E04F 13/0841* (2013.01); *E04F 13/16* (2013.01);
(Continued)

(58) Field of Classification Search
CPC ... E04F 13/0864; E04F 13/0841; E04F 13/16; E04F 13/0846; E04F 13/0853; F16B 5/02; F16B 5/0614
See application file for complete search history.

(56) References Cited

U.S. PATENT DOCUMENTS 625,427 A ‡ 5/1899 Stewart, Jr. et al. . F16B 7/0446
403/190
773,207 A ‡ 10/1904 Kaiser ................. F22B 37/202
122/510
(Continued)

FOREIGN PATENT DOCUMENTS

AT          1969 U1 *  2/1998
EP       1426520 A1 ‡  6/2004  ............... F16B 5/02
(Continued)

OTHER PUBLICATIONS

Office Action and Search Report from the Chinese Patent Office dated Nov. 3, 2020 in related Chinese application No. 201810189496, and translation thereof.

*Primary Examiner* — Brian D Mattei
*Assistant Examiner* — Charissa Ahmad
(74) *Attorney, Agent, or Firm* — J-TEK LAW PLLC; Scott T. Wakeman; Mark A. Ussai

(57) ABSTRACT

A fitting includes a first mounting portion connectable with a first member and having opposing planar surfaces and inner and outer ends. A second mounting portion is angled with respect to the first mounting portion, is connectable with a second member and has opposing planar surfaces, an outer end and an inner end integrally formed with the first mounting portion inner end. A boss projects outwardly from the second mounting portion first surface and is disposable within a recess of the second member or a stiffener coupled with the second member. The boss has an inner end adjacent to the second mounting portion inner end, an outer end spaced from the inner end, a centerline between the boss inner and outer ends, and an outermost surface spaced from the second mounting portion first surface by a spacing distance having a value greater than zero at all points along the centerline.

14 Claims, 13 Drawing Sheets

Related U.S. Application Data

(60) Provisional application No. 62/468,553, filed on Mar. 8, 2017.

(52) U.S. Cl.
CPC ........ *F16B 5/0088* (2013.01); *E04F 13/0846* (2013.01); *E04F 13/0853* (2013.01)

(56) References Cited

U.S. PATENT DOCUMENTS

| | | | | |
|---|---|---|---|---|
| 3,029,465 A | * | 4/1962 | Graber | A47H 15/04 248/265 |
| 3,113,358 A | | 12/1963 | Zell et al. | |
| 3,466,071 A | ‡ | 9/1969 | Reed | E04B 1/2608 403/231 |
| 3,828,514 A | ‡ | 8/1974 | Jureit | E04B 1/2608 403/230 |
| 3,972,168 A | ‡ | 8/1976 | Allen | E04B 1/4114 52/698 |
| 4,140,294 A | * | 2/1979 | Zwarts | A47H 1/122 248/265 |
| D254,476 S | ‡ | 3/1980 | Gilb | D8/349 |
| 4,219,981 A | ‡ | 9/1980 | Stewart | E04D 3/30 52/478 |
| 4,261,593 A | ‡ | 4/1981 | Yeager | A01C 7/201 280/415.1 |
| 4,691,491 A | ‡ | 9/1987 | Lilley | E04D 3/3602 52/22 |
| 4,918,893 A | ‡ | 4/1990 | Vandenbroucke | E04B 1/7666 52/404.2 |
| 4,949,924 A | * | 8/1990 | Carmody | A47G 7/044 248/215 |
| 5,044,589 A | * | 9/1991 | Milne | A47H 1/124 248/265 |
| 5,060,710 A | ‡ | 10/1991 | Haarer | A47H 1/144 160/178.1 R |
| 5,131,616 A | ‡ | 7/1992 | Biba | A47H 1/144 160/902 |
| 5,398,902 A | ‡ | 3/1995 | Crowe | E05D 15/0652 16/94 R |
| 5,664,392 A | ‡ | 9/1997 | Mucha | E04B 2/96 248/262 |
| 5,904,023 A | ‡ | 5/1999 | diGirolamo | E04B 2/7457 403/388 |
| 6,213,679 B1 | ‡ | 4/2001 | Frobosilo | E04B 2/96 403/40 |
| 6,585,208 B1 | ‡ | 7/2003 | Fraser | A47H 1/10 248/251 |
| 7,065,932 B2 | ‡ | 6/2006 | Roesset | E04B 1/2608 403/231 |
| 7,299,593 B1 | * | 11/2007 | diGirolamo | E04B 2/58 52/274 |
| 7,533,508 B1 | ‡ | 5/2009 | diGirolamo | E04B 2/58 248/300 |
| 7,658,356 B1 | ‡ | 2/2010 | Nehls | F24S 25/33 248/30 |
| D644,503 S | ‡ | 9/2011 | Crane | A01C 7/201 D8/354 |
| D663,190 S | ‡ | 7/2012 | Mota | D16/242 |
| 9,090,025 B2 | ‡ | 7/2015 | Balk | F16B 3/13 |
| 9,168,783 B2 | * | 10/2015 | Black | B60B 29/00 |
| 10,285,514 B2 | ‡ | 5/2019 | Iellimo | B65G 1/02 |
| 10,323,414 B2 | ‡ | 6/2019 | Haba | E04B 1/40 |
| 2002/0023405 A1 | * | 2/2002 | Zadeh | E04B 1/2403 52/714 |
| 2007/0157536 A1 | ‡ | 7/2007 | Foss | E04B 9/064 52/506.07 |
| 2010/0148027 A1 | ‡ | 6/2010 | Lenk | G01D 11/30 248/309.1 |
| 2011/0272536 A1 | | 11/2011 | Valembois | |
| 2013/0287479 A1 | | 10/2013 | Valembois | |
| 2017/0284435 A1 | * | 10/2017 | Fauchery | F16B 5/02 |
| 2018/0017206 A1 | * | 1/2018 | Fauchery | F16B 5/02 |

FOREIGN PATENT DOCUMENTS

| | | | | |
|---|---|---|---|---|
| EP | 1426520 B1 | 8/2006 | | |
| EP | 2379313 B1 | 3/2014 | | |
| EP | 2665597 B1 | 3/2015 | | |
| EP | 3372845 A1 | ‡ | 9/2018 | F16B 5/02 |
| EP | 3372845 A1 | | 9/2018 | |
| KR | 200214426 Y1 | * | 3/2001 | |
| KR | 20010105722 A | * | 11/2001 | |
| KR | 100389114 B1 | * | 6/2003 | |
| KR | 200420004 Y1 | * | 6/2006 | |

\* cited by examiner
‡ imported from a related application

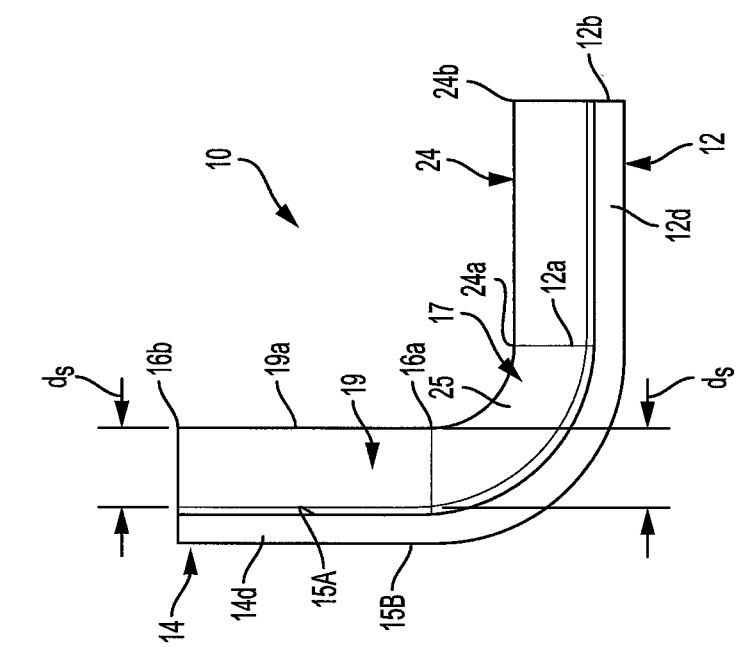
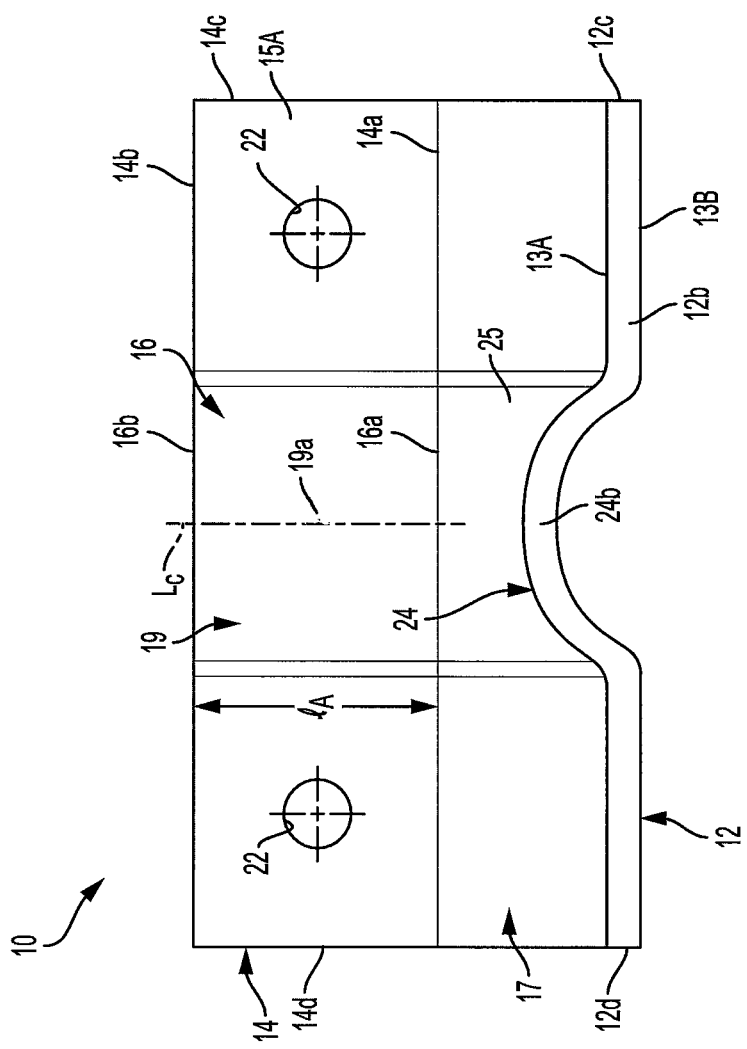

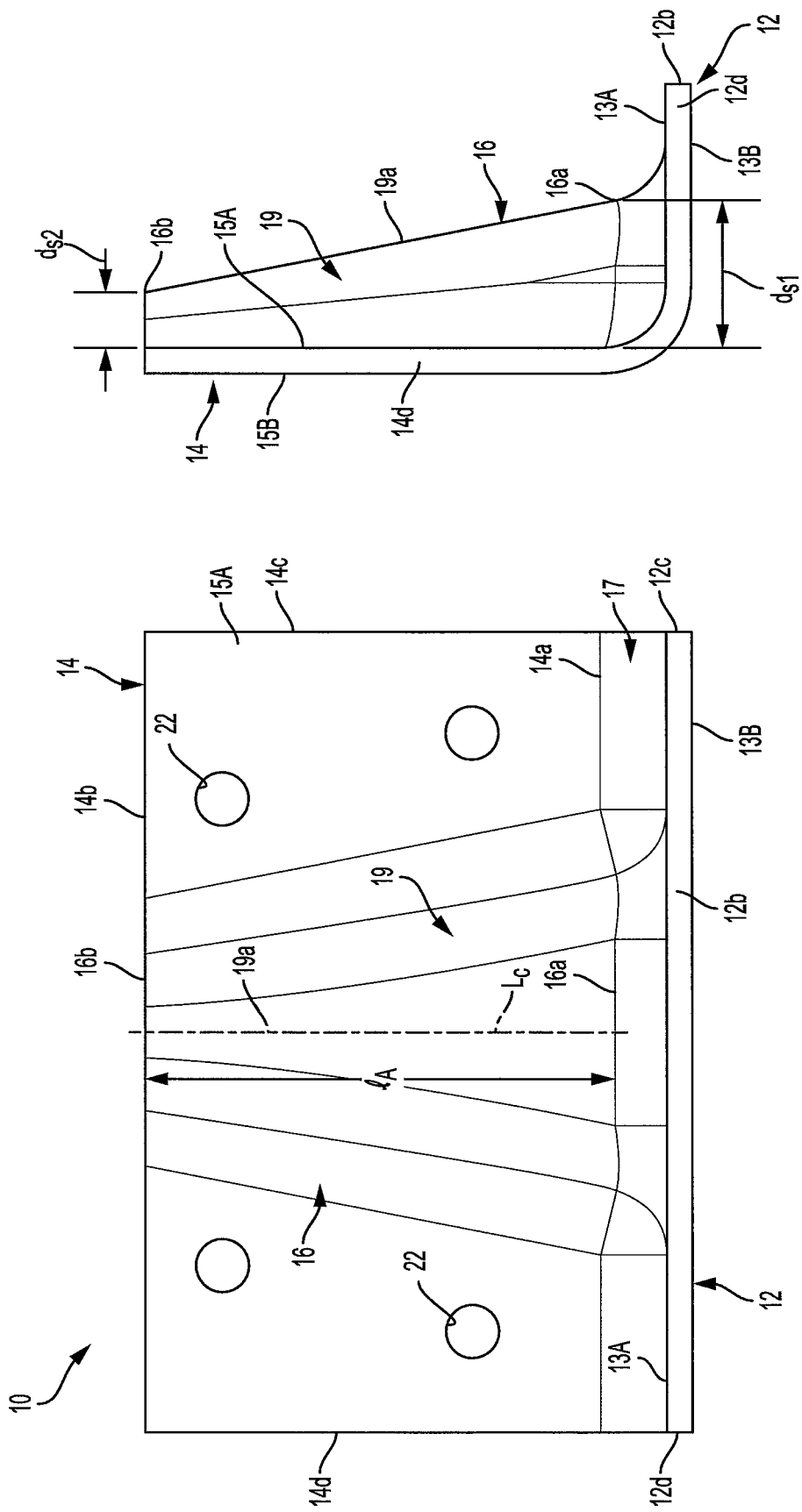

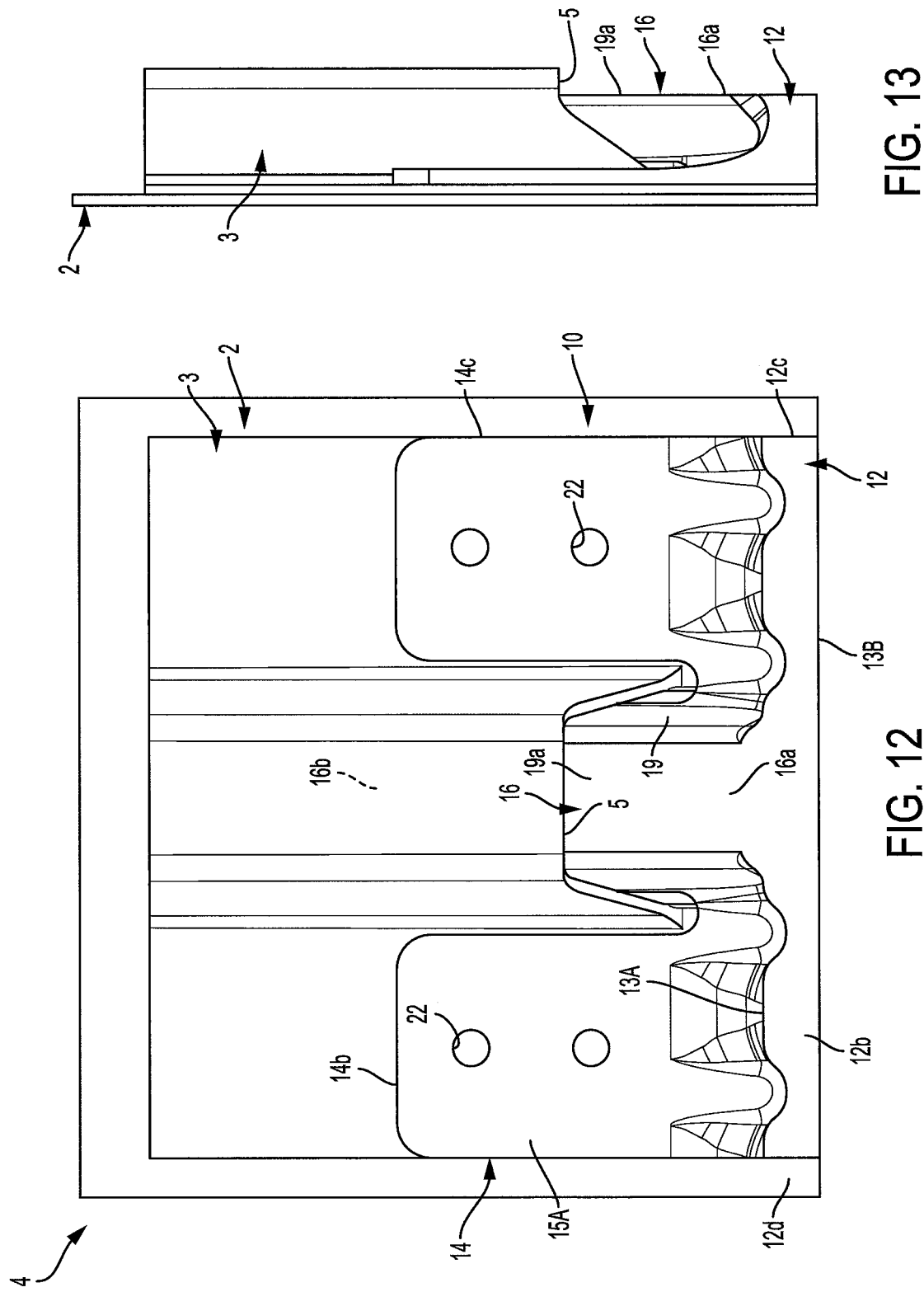

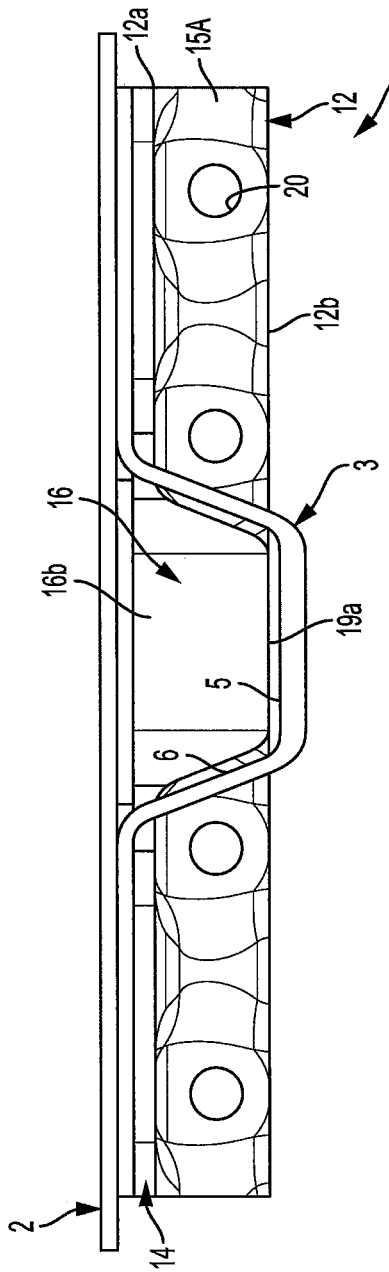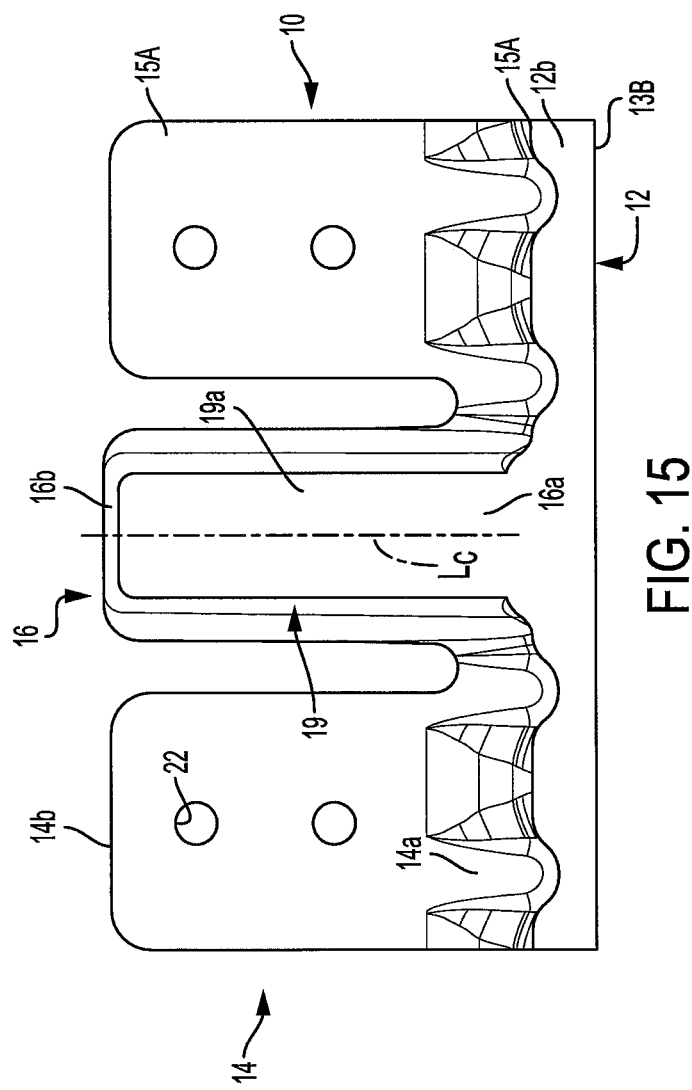

FITTING WITH IMPROVED BOSS STRUCTURE

CROSS REFERENCE

This application is a continuation of prior application Ser. No. 15/915,394, filed Mar. 8, 2018, which claims the benefit of U.S. Provisional Application No. 62/468,553, filed Mar. 8, 2017.

BACKGROUND OF THE INVENTION

The present invention relates to connector assemblies, particularly connectors including fittings used to connect angularly arranged members.

Fittings or brackets for connecting two or more members are generally known. When intended to connect to surfaces that are generally angled or orthogonal to each other, such fittings/brackets are often generally L-shaped, generally T-shaped or "corner" shaped. In certain applications in which weight is an important consideration, such as the aircraft industry, the fittings may be made of a composite material of fibers embedded within resin. Often, reinforcing members or "stiffeners" are used to connect the fitting with one of the members.

SUMMARY OF THE INVENTION

In one aspect, the present invention is a fitting for connecting first and second members, the fitting comprising a first mounting portion connectable with the first member and having opposing first and second generally planar surfaces and opposing inner and outer ends. A second mounting portion is generally angled with respect to the first mounting portion and is connectable with the second member. The second mounting portion has opposing first and second planar surfaces and opposing inner and outer ends, the second mounting portion inner end being integrally formed with the first mounting portion inner end. Further, at least one generally elongated boss projects outwardly from a remainder of the second mounting portion and is configured to be disposed within a recess formed in the second member or a stiffener coupled with the second member. The boss has an inner end at least generally adjacent to the inner end of the second mounting portion, an opposing outer end spaced from the second mounting portion inner end, a centerline extending between the boss inner and outer ends, and an outermost surface section spaced from the second mounting portion first surface by a spacing distance. The spacing distance has a value greater than zero at all points along the centerline.

In another aspect, the present invention is a mechanical assembly comprising a first member and a second member spaced from the first member, wherein the second member has a recess or is coupled with a stiffener having a recess, the recess being defined by an inner surface extending generally along a centerline. A fitting is formed of a composite material including fibers and resin and includes a first mounting portion connectable with the first member and having opposing first and second generally planar surfaces and opposing inner and outer ends. A second mounting portion is generally angled with respect to the first mounting portion and is connectable with the second member, the second mounting portion having opposing first and second planar surfaces and opposing inner and outer ends. The second mounting portion inner end is integrally formed with the first mounting portion inner end and the second mounting portion first surface faces generally toward the first mounting portion first surface. Further, at least one generally elongated boss projects outwardly from a remainder of the second mounting portion. The boss has a first end located at least generally adjacent to the second mounting portion inner end, an opposing second end spaced from the second mounting portion inner end, and an outer surface extending generally between the first and second ends. The boss is disposed within the recess of the second member or the stiffener such that the boss outer surface is juxtaposed against at least a substantial portion of the recess inner surface.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 2 is a front plan view of the first construction fitting;

FIG. 3 is a side plan view of the first construction fitting;

FIG. 6 is a front plan view of the second construction fitting;

FIG. 7 is a side plan view of the second construction fitting;

FIG. 12 is a front plan view of the mechanical assembly with fourth construction fitting;

FIG. 13 is a side plan view of the mechanical assembly with fourth construction fitting;

FIG. 14 is a top plan view of the mechanical assembly with fourth construction fitting;

FIG. 15 is a front plan view of the fourth construction fitting;

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 18:
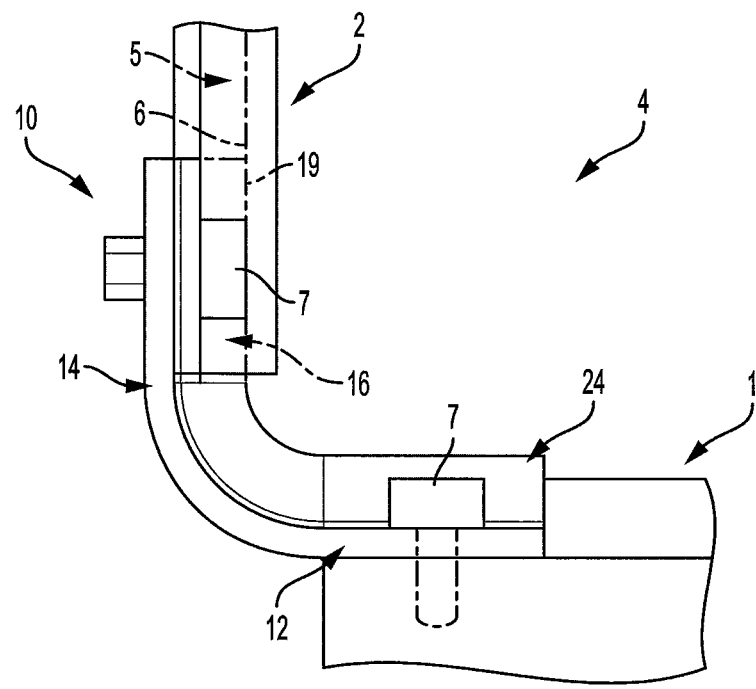
FIG. 18 is a side plan view of the mechanical assembly with the first construction fitting.
Figure 19:
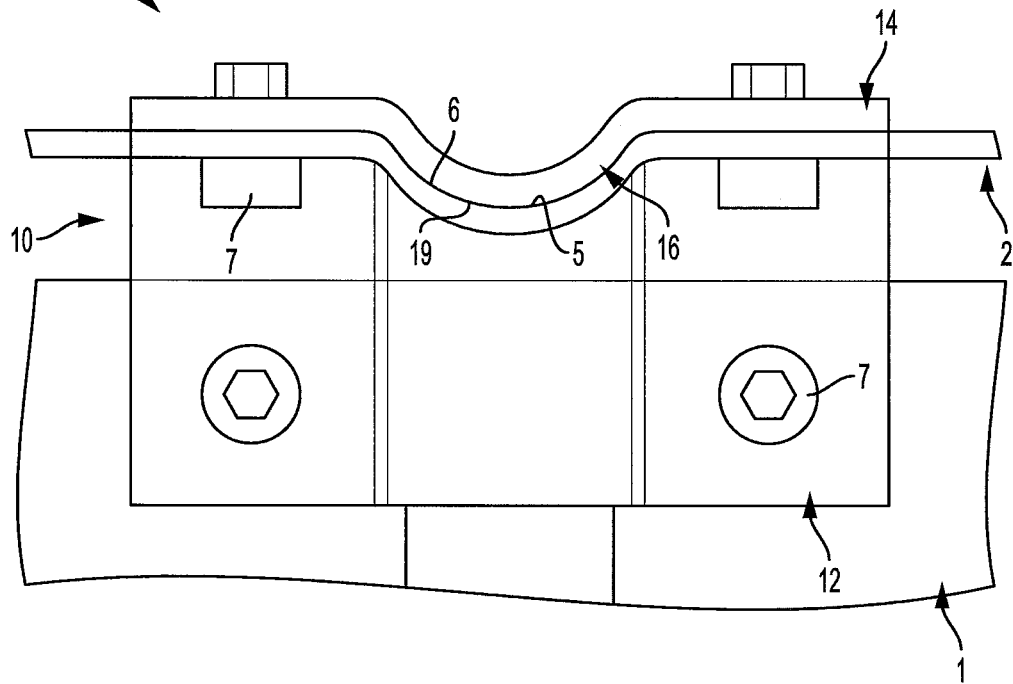
FIG. 19 is a top plan view of the mechanical assembly with the first construction fitting.

Referring now to the drawings in detail, wherein like numbers are used to indicate like elements throughout, there is shown in FIGS. 1-19 a cleat or fitting 10 for connecting first and second members 1, 2, preferably components of an aerospace structure (e.g., strut, frame, etc.), such that the fitting 10, the first and second members 1, 2, and possibly one or more stiffeners 3, form a mechanical assembly 4. The fitting 10 basically comprises a first mounting portion 12 connectable with the first member 1, a second mounting portion 14 connectable with the second member 2, either directly or through a stiffener 3, and at least one generally elongated boss 16 formed in the second mounting portion 14. The first mounting portion 12 has opposing first and second generally planar surfaces 13A, 13B, opposing inner and outer ends 12a, 12b, and opposing sides 12c, 12d. The second mounting portion 14 is generally angled with respect to the first mounting portion 12 and has opposing first and second planar surfaces 15A, 15B, opposing inner and outer ends 14a, 14b, the second mounting portion inner end 14a being integrally formed with the first mounting portion inner end 12a, preferably through an integral joint portion 17, and opposing sides 14c, 14d. Preferably, the first mounting portion 12 has at least one opening 20 for receiving a fastener 7 (FIGS. 18 and 19) to connect the fitting 10 with the first member 1 and the second mounting portion 14 has at least one opening 22 for receiving a fastener 7 to connect the fitting 10 with the second member 2 or a stiffener 3 coupled with the second member 2. Further, the first and second mounting portions 12, 14 and the boss(es) 16 are formed of a composite material including generally long strand fibers and resin, but may be formed of any other appropriate material.

Figure 9:
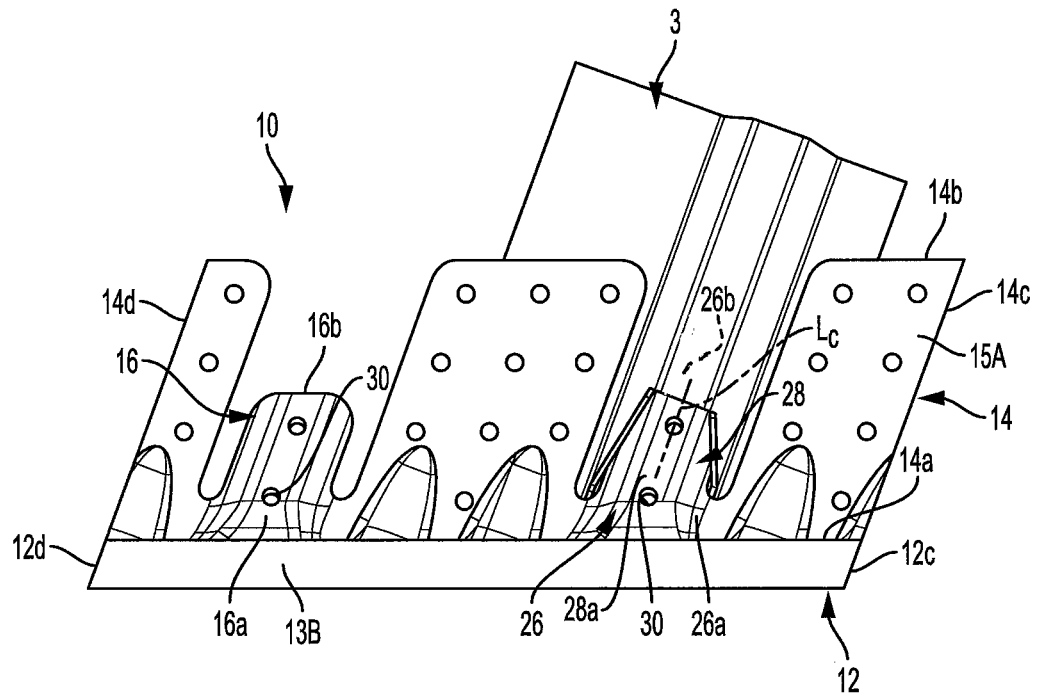
FIG. 9 is a front plan view of a third construction of a fitting in accordance with the present invention, shown engaged by a stiffener and having a second boss.
Figure 10:
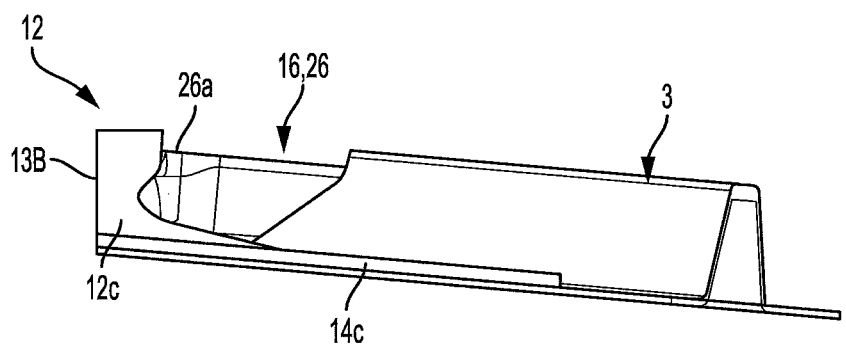
FIG. 10 is a side plan view of the third construction fitting.
Figure 11:
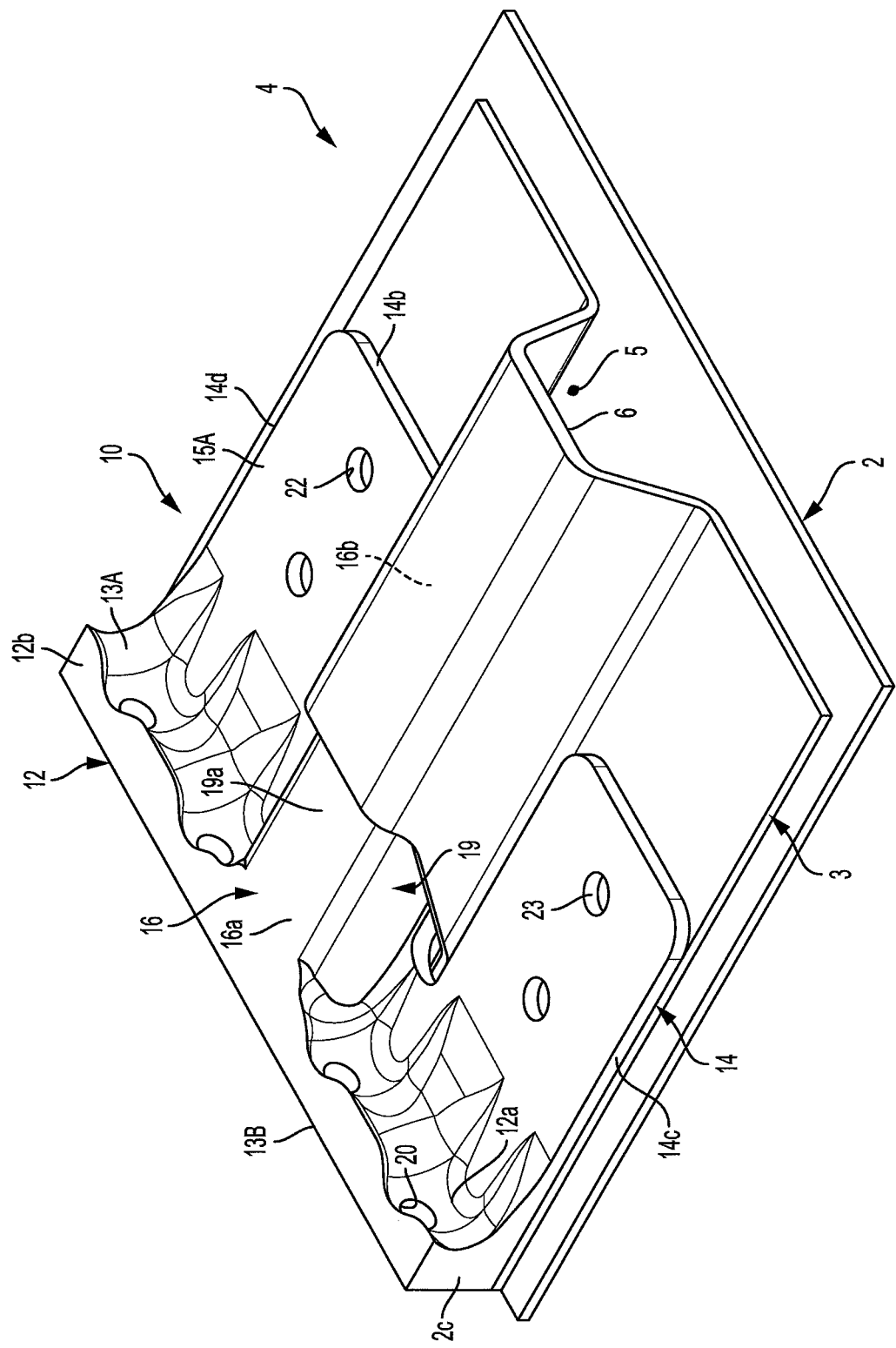
FIG. 11 is a perspective view of a mechanical assembly including a fourth construction fitting in accordance with the present invention, shown engaged by a stiffener connected with a second member.
Figure 16:
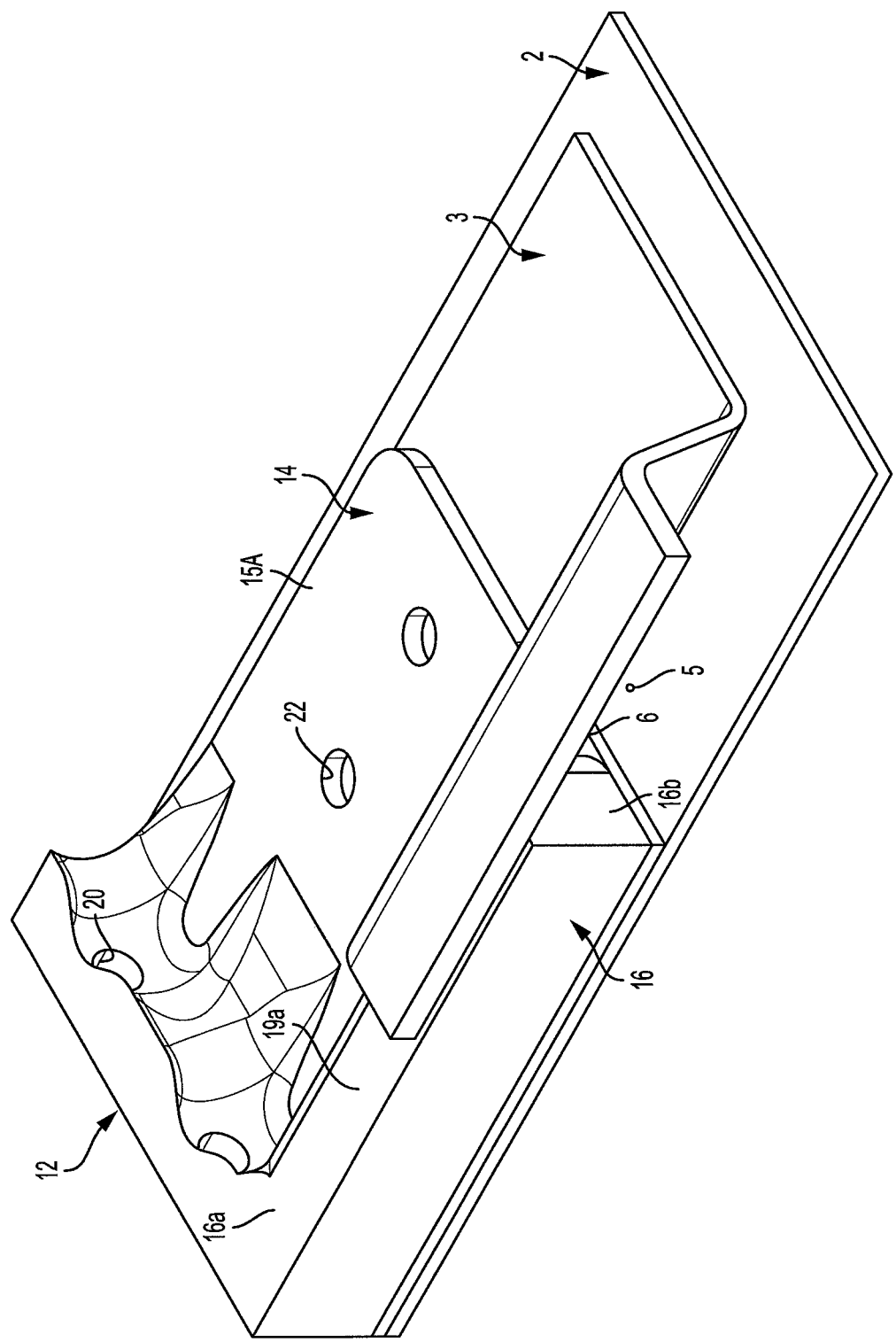
FIG. 16 is a perspective view of a mechanical assembly including a fifth construction fitting in accordance with the present invention, shown engaged by a stiffener connected with a second member.
Figure 17:
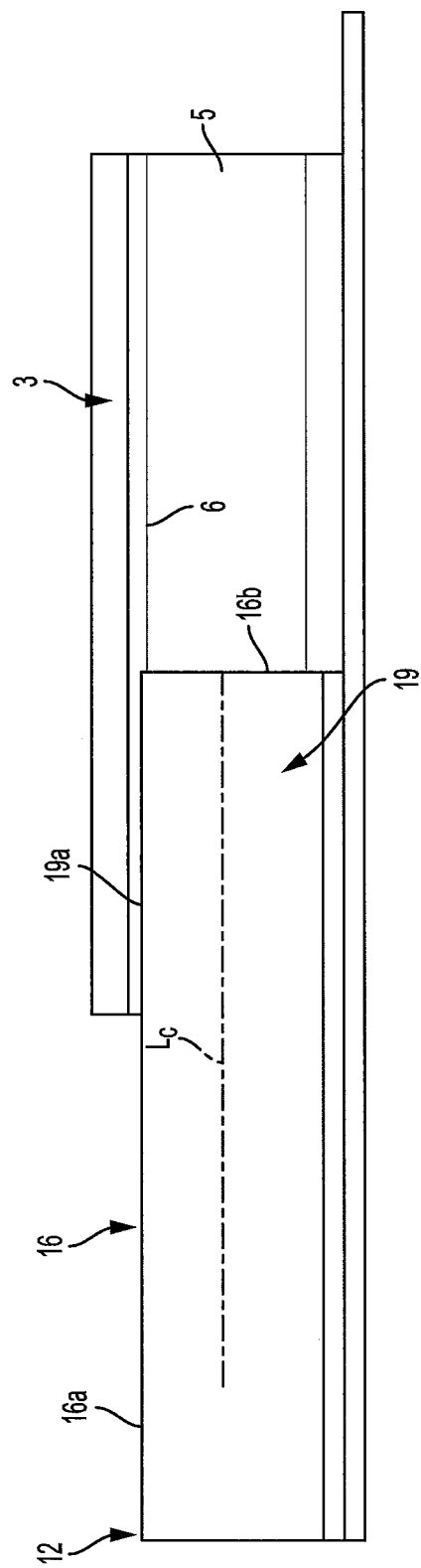
FIG. 17 is a side plan view of the mechanical assembly with fifth construction fitting.

Further, the one or more elongated bosses 16 each project outwardly from a remainder of the second mounting portion 14 and are each configured to be disposed within a separate recess 5 formed in the second member 2 or a stiffener 3 coupled with the second member 2, the recess 5 having an inner surface 6, as best shown in FIGS. 11-14, 16 and 17. The one or more bosses 16 are provided to couple and relatively position the fitting 10 and the second member 2, or an intermediate stiffener 3, as well as to reinforce the assembly 4 and more effectively transfer loading between the fitting 10 and the second member 2. Each boss 16 has an inner end 16a at least generally adjacent to the inner end 14a of the second mounting portion 14, an opposing outer end 16b spaced from the second mounting portion inner end 12a, and a centerline $L_C$ extending between the boss inner and outer ends 16a, 16b. The outer end 16b of each boss 16 may be located at or adjacent to the second mounting portion outer end 14b, as shown in FIGS. 1-8 and 11-19, or may be spaced inwardly from the mounting portion outer end 14b, as shown in FIGS. 9 and 10.

Furthermore, the boss(es) 16 each have inner and outer surfaces 19, 21 and are each formed such that the boss outer surface 19 is generally juxtaposed against at least a substantial portion of the recess inner surface 6, such that loading is more effectively transferred between the fitting 10 and the second member 2 or a stiffener 3. The boss outer surface 19 may be formed to contact the recess surface 6 without fastening, as shown in FIGS. 1-8 and 15-19, or the boss 16 may include one or more openings 30 for receiving a fastener to connect the boss 16 with the second member 2 or a stiffener 3, as depicted in FIGS. 9 and 10. Also, the inner surface 21 of each boss 16 extends inwardly from the second planar surface 15B of the second mounting portion 14 and defines a recess 23, which may be generally hollow or contain a filler material (e.g., bulk molding compound).

Referring particularly to FIGS. 2, 3, 6 and 7, each elongated boss 16 is preferably formed such that an outermost surface section 19a of the outer surface 19 is spaced from the second mounting portion first planar surface 15A by a spacing distance $d_S$, with the spacing distance $d_S$ having a value greater than zero at all points along the centerline $L_C$. Also, the boss 16 is formed having a substantial "axial" length $l_A$ along the centerline $L_C$, as indicated in FIGS. 2 and 6. As such, a major portion of each boss 16, preferably the entire boss 16, is spaced outwardly from adjacent sections of the first planar surface 15A of the second mounting portion 14, so as to provide a relatively substantial complementary outer surface 19 to engage with the inner surface 6 of a recess 5. Thereby, the neutral axis (not indicated) of the mechanical assembly 4, which is the axis through the assembly components at which the components are not subjected to stresses or strains, extends generally centrally through each boss 16 and either the second member 2, or the stiffener 3, engaged with the particular boss 16.

In certain constructions as shown in FIGS. 1-4, the one or more bosses 16 are each formed such that the spacing distance $d_S$ has a generally constant value along a substantial portion of the centerline $L_C$, such that the boss 16 has a generally constant shape between the inner and outer ends 16a, 16b. In other constructions as shown in FIGS. 5-8, the boss(es) 16 are each formed such that the spacing distance $d_S$ varies between a greatest value $d_{S1}$ at the boss inner end 16a and a least value $d_{S2}$ at the boss outer end 16b, such that the boss 16 has a tapering shape.

Figure 1:
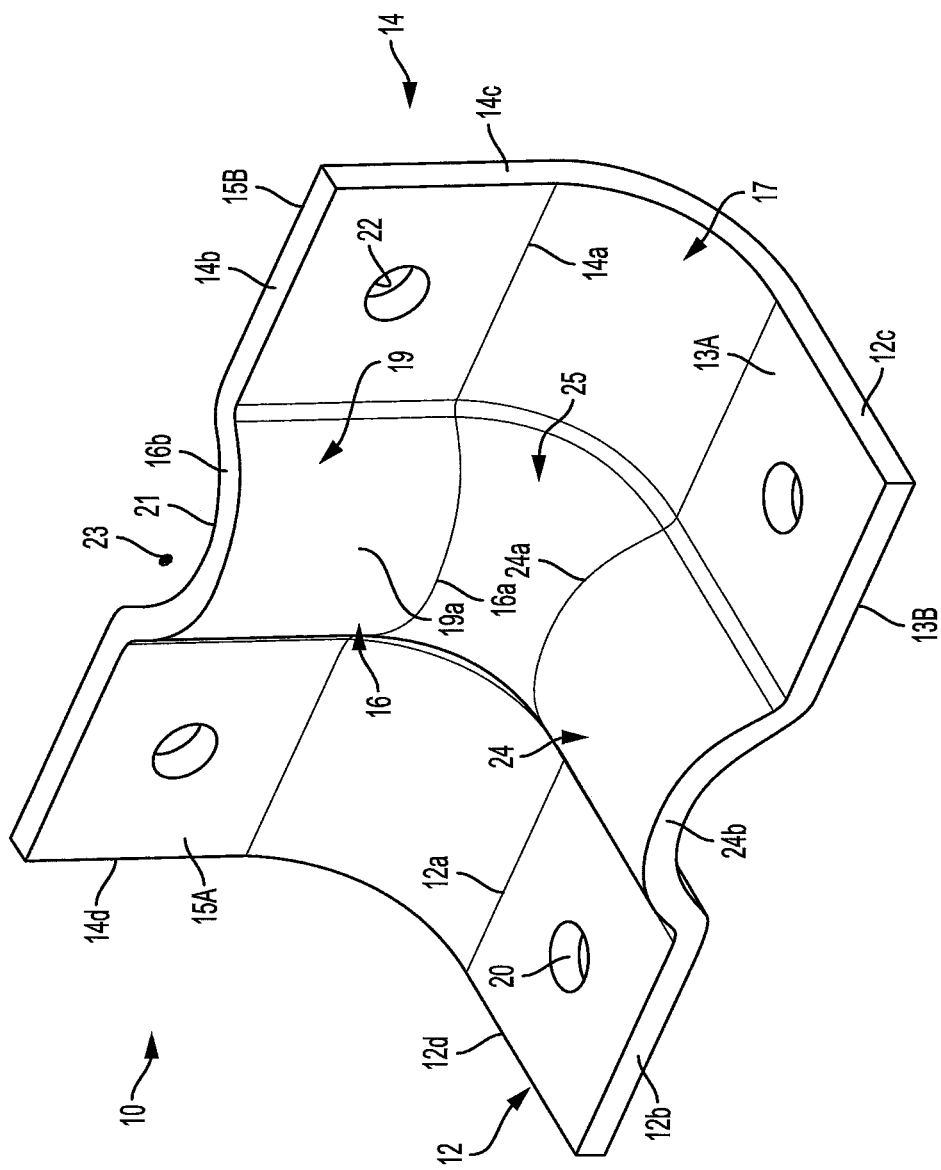
FIG. 1 is a perspective view of a first construction of a cleat or "fitting" in accordance with the present invention.
Figure 4:
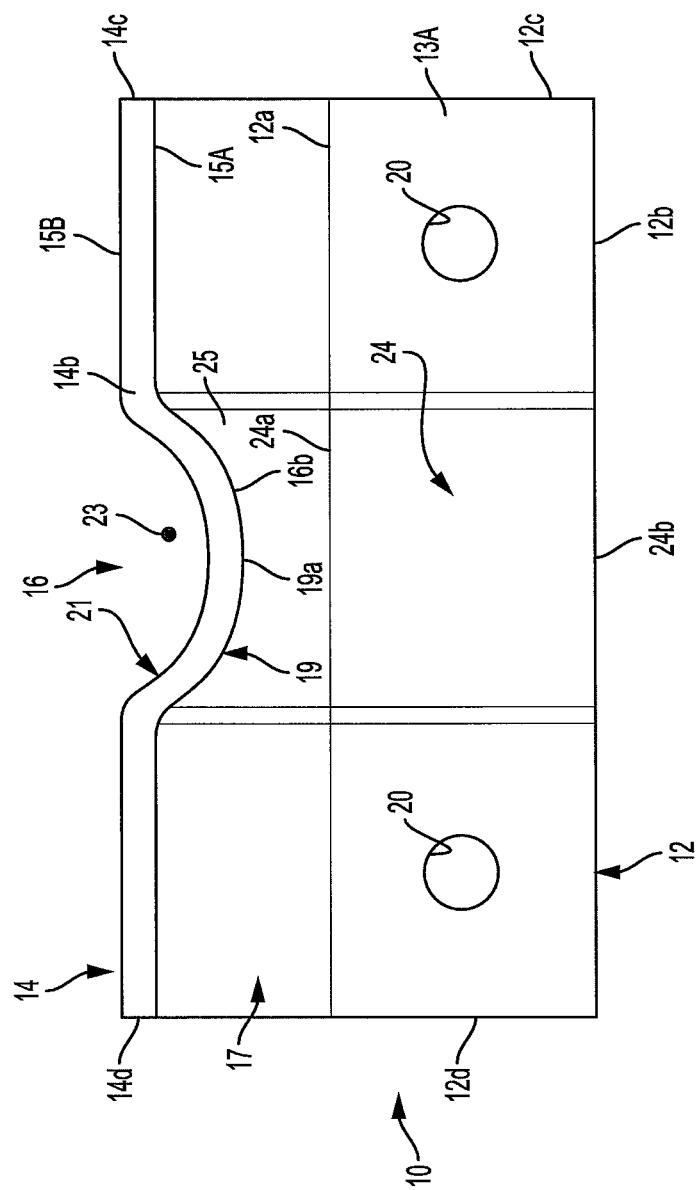
FIG. 4 is a top plan view of the first construction fitting.
Figure 5:
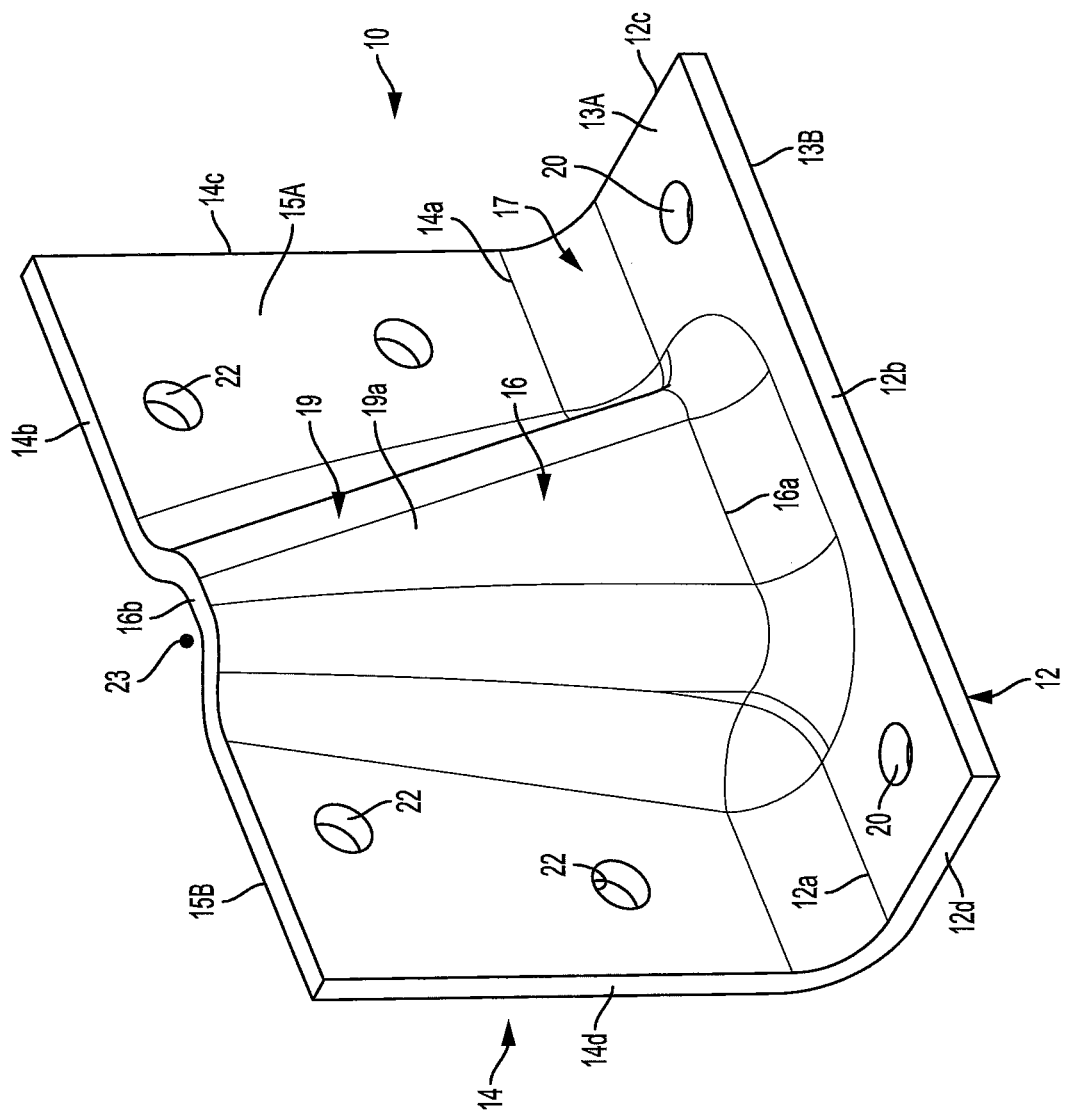
FIG. 5 is a perspective view of a second construction of a fitting in accordance with the present invention.
Figure 8:
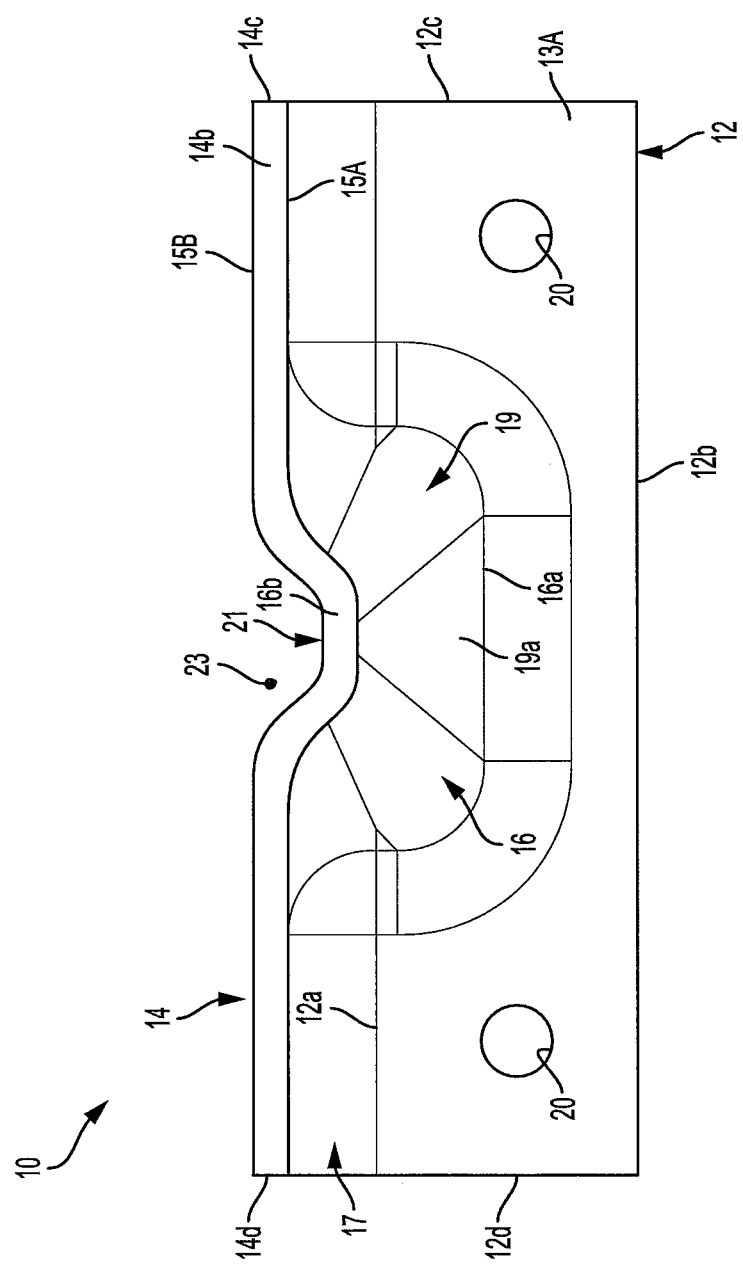
FIG. 8 is a top plan view of the second construction fitting.

Referring to FIGS. 4, 8 and 14, each boss 16 has a cross-sectional profile within any plane extending through the second mounting portion 14 generally perpendicularly to the first and second planar surfaces 15A, 15B. The cross-sectional profile may be generally circular, as shown in FIGS. 4 and 8, generally rectangular (FIG. 14), generally complex-shaped or have any other appropriate shape (no alternatives shown). Further, the cross-sectional profile may have a generally constant area at points along a substantial portion of the centerline $L_C$, as with the boss structures of FIGS. 4 and 14, or may have an area that varies between a greatest value at the boss first, inner end 16a and a least value at the boss second, outer end 16b, as depicted in FIG. 8. Furthermore, each boss 16 may be formed so as to extend in a generally "straight" path between the second mounting portion inner and outer ends 14a, 14b, as depicted in FIGS. 1-8 and 11-19, or may be generally angled such that the outer end 16b is offset toward one side 14c or 14d of the second mounting portion 14, as shown in FIGS. 9 and 10.

Referring to FIGS. 1-4, in certain constructions, the first mounting portion 12 includes at least one elongated boss 24 projecting outwardly from a remainder of the first mounting portion first planar surface 13A. The first mounting portion boss 24 has an inner end 24a connected with the inner end 16a of the second mounting portion boss 16, preferably through a boss portion 25 of the joint 17, and an outer end 24b spaced from the inner end 24a. In such a fitting construction, the boss 24 may be engaged with a recess of the first member 1 (or a stiffener coupled with the first member 1), so as to facilitate positioning, strengthen the connection between fitting 10 and first member 1 and optimize transference of force between the components 1 and 10, or may merely provide a passage for evacuating fluid from the boss 16 to avoid damage due to icing and prevent trapped air.

Referring to FIGS. 9 and 10, the fitting 10 may be formed such that the boss 16 is a first boss and the second mounting portion 14 includes a second, generally elongated boss 26 spaced from the first boss 16, such that the second boss 26 is located between the first boss 16 and one side 14c or 14d of the second mounting portion 14. The second boss 26 projects outwardly from a remainder of the second mounting portion 14 and is configured to be disposed within another recess 5 formed either in the second member 2 or a stiffener 3 coupled with the second member 2. The second boss 26 has an inner end 26a located at least generally adjacent to the inner end 14a of the second mounting portion 14, an opposing outer end 26b spaced from the second mounting portion inner end 14a, and a centerline $L_{C2}$ extending between the boss inner and outer ends 26a, 26b. The second boss 26 has an outer surface 28 with an outermost surface section 28a spaced from the first planar surface 15A of the second mounting portion 14 by a spacing distance $d_{S2}$. As with the first elongated boss 16, the second boss 26 is formed such that the spacing distance $d_{S2}$ has a value greater than zero at all points along the centerline $L_{C2}$, which may be the same or different than the structure of the first boss 16 (e.g. spaced a greater or lesser constant distance from the surface 15A, formed tapering versus constant, etc.). Furthermore, the second boss 26 is provided to function generally as the first boss 16.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined herein and in the appended claims.

We claim:

1. A mechanical assembly comprising:
a first member;
a second member spaced from the first member, wherein the second member has a recess or is coupled with a stiffener having a recess, the recess being defined by an inner surface extending generally along a centerline;
a fitting formed of a composite material including fibers and resin, the fitting including:
a first mounting portion connected with the first member and having opposing first and second generally planar surfaces and opposing inner and outer ends;
a second mounting portion generally angled with respect to the first mounting portion and connected with the second member, the second mounting portion having opposing first and second planar surfaces, opposing first and second side edges, and opposing inner and outer ends, the second mounting portion inner end being integrally formed with the first mounting portion inner end and the second mounting portion first surface facing generally toward the first mounting portion first surface; and
at least one generally elongated boss projecting outwardly from a remainder of the second mounting portion so as to be centered between the first and second side edges, the boss having a first end located at least generally adjacent to second mounting portion inner end, an opposing second end spaced from the second mounting portion inner end, and an outer surface extending generally between the first and second ends, the boss being disposed within the recess of the second member or the stiffener such that the boss outer surface is juxtaposed against at least a substantial portion of the recess inner surface;
wherein the second mounting portion has a first fastener opening disposed between the boss and the first side edge of the second mounting portion and a second fastener opening disposed between the boss and the second side edge of the second mounting portion; and
wherein a first fastener extends through the first fastener opening and into the second member and a second fastener extends through the second fastener opening and into the second member such that the first and second fasteners connect the second mounting portion to the second member.

2. The mechanical assembly as recited in claim 1 wherein the boss has a cross-sectional profile within any plane extending through the second mounting portion generally perpendicular to the first and second planar surfaces, the cross-sectional profile being one of generally circular, generally rectangular and generally complex-shaped.

3. The mechanical assembly as recited in claim 2 wherein the cross-sectional profile has a generally constant area at points along a substantial portion of the centerline.

4. The mechanical assembly as recited in claim 2 wherein the cross-sectional profile has a cross-sectional area that varies between a greatest value at the boss first end and a least value at the boss second end.

5. The mechanical assembly as recited in claim 1 wherein the first mounting portion includes at least one boss projecting outwardly from the first mounting portion first surface and having an inner end connected with the inner end of the second mounting portion boss and an outer end spaced from the inner end.

6. The mechanical assembly as recited in claim 5 wherein a portion of the first member is disposed within the at least one boss of the first mounting portion.

7. The mechanical assembly as recited in claim 1 wherein the at least one boss is a first boss and the second mounting portion further includes a second generally elongated boss projecting outwardly from a remainder of the second mounting portion and configured to be disposed within another recess formed in the second member or a stiffener coupled with the second member, the second boss having an inner end at least generally adjacent to the inner end of the second mounting portion, an opposing outer end spaced from the second mounting portion inner end, a centerline extending between the boss inner and outer ends, and an outermost surface section spaced from the second mounting portion first surface by a spacing distance, the spacing distance having a value greater than zero at all points along the centerline.

8. The mechanical assembly as recited in claim 1 wherein the first mounting portion has at least one opening for receiving a fastener to connect the fitting with the first member and the second mounting portion has at least one opening for receiving a fastener to connect the fitting with the second member or a stiffener coupled with the second member.

9. The mechanical assembly as recited in claim 1 wherein the composite material includes generally long strand fibers.

10. The mechanical assembly as recited in claim 1 wherein the at least one boss has a generally concave surface extending inwardly from the second mounting portion second planar surface and defining a recess, wherein the recess is generally hollow or the recess contains a filler material.

11. The mechanical assembly as recited in claim 1 wherein the juxtaposition of the boss outer surface section against the recess inner surface of the second member or the stiffener more effectively transfers loading between the fitting and the second member or the stiffener.

12. The mechanical assembly as recited in claim 1 wherein:
the first mounting portion has opposing first and second side edges and includes at least one boss projecting outwardly from the first mounting portion first surface so as to be centered between the first and second side edges of the first mounting portion, the boss of the first mounting portion having an inner end connected with the inner end of the second mounting portion boss and an outer end spaced from the inner end, a third fastener opening is disposed between the boss of the first mounting portion and the first side edge of the first mounting portion and a fourth fastener opening is disposed between the boss of the first mounting portion and the second side edge of the first mounting portion; and
a third fastener extends through the third fastener opening and into the first member and a fourth fastener extends through the fourth fastener opening and into the first member such that the third and fourth fasteners connect the first mounting portion to the first member.

13. A mechanical assembly comprising:
a first member having a projection;
a second member spaced from the first member, wherein the second member has a recess or is coupled with a stiffener having a recess, the recess being defined by an inner surface extending generally along a centerline;
a fitting formed of a composite material including fibers and resin, the fitting including:
a first mounting portion connected with the first member and having opposing first and second generally planar surfaces and opposing inner and outer ends;
a second mounting portion generally angled with respect to the first mounting portion and connected with the second member, the second mounting portion having opposing first and second planar surfaces, opposing first and second side edges, and opposing inner and outer ends, the second mounting portion inner end being integrally formed with the first mounting portion inner end and the second mounting portion first surface facing generally toward the first mounting portion first surface;
at least one generally elongated boss projecting outwardly from a remainder of the second mounting portion so as to be centered between the first and second side edges, the boss having a first end located at least generally adjacent to second mounting portion inner end, an opposing second end spaced from the second mounting portion inner end, and an outer surface extending generally between the first and second ends, the boss being disposed within the recess of the second member such that the boss outer surface is juxtaposed against at least a substantial portion of the recess inner surface; and
at least one generally elongated boss projecting outwardly from a remainder of the first mounting portion, the first mounting portion boss having an inner end connected with the inner end of the second mounting portion boss, an outer end spaced from the inner end, and an inner surface defining a recess, at least a portion of the first member projection being disposed with the recess of the first mounting portion boss;
wherein the second mounting portion has a first fastener opening disposed between the boss and the first side edge of the second mounting portion and a second fastener opening disposed between the boss and the second side edge of the second mounting portion; and
wherein a first fastener extends through the first fastener opening and into the second member and a second fastener extends through the second fastener opening and into the second member such that the first and second fasteners connect the second mounting portion to the second member.

14. The mechanical assembly as recited in claim 13 wherein:
the first mounting portion has opposing first and second side edges, the boss of the first mounting portion is centered between the first and second side edges, a third fastener opening is disposed between the boss of the first mounting portion and the first side edge of the first mounting portion and a fourth fastener opening is disposed between the boss of the first mounting portion and the second side edge of the first mounting portion; and
a third fastener extends through the third fastener opening and into the first member and a fourth fastener extends through the fourth fastener opening and into the first member such that the third and fourth fasteners connect the first mounting portion to the first member.

* * * * *